United States Patent
Eom et al.

(10) Patent No.: US 10,020,486 B2
(45) Date of Patent: Jul. 10, 2018

(54) BATTERY PACK

(71) Applicant: LG CHEM, LTD., Seoul (KR)

(72) Inventors: Young-Sop Eom, Daejeon (KR);
Jun-Yeob Seong, Daejeon (KR);
Ki-Youn Kim, Daejeon (KR);
Sung-Chun Yu, Daejeon (KR); Dal-Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 86 days.

(21) Appl. No.: 15/112,779

(22) PCT Filed: Jan. 14, 2015

(86) PCT No.: PCT/KR2015/000379
§ 371 (c)(1),
(2) Date: Jul. 20, 2016

(87) PCT Pub. No.: WO2015/111865
PCT Pub. Date: Jul. 30, 2015

(65) Prior Publication Data
US 2016/0336577 A1 Nov. 17, 2016

(30) Foreign Application Priority Data

Jan. 21, 2014 (KR) .................. 10-2014-0007152

(51) Int. Cl.
*H01M 2/30* (2006.01)
*H01M 2/10* (2006.01)
*H01M 2/02* (2006.01)

(52) U.S. Cl.
CPC ............ *H01M 2/30* (2013.01); *H01M 2/024* (2013.01); *H01M 2/1077* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 3,692,965 A | * | 9/1972 | Gardner ................. | H01H 9/285 180/287 |
| 4,448,469 A | * | 5/1984 | Metzger ............... | H01R 11/284 439/304 |
| 2004/0018426 A1 | | 1/2004 | Chieh et al. | |

FOREIGN PATENT DOCUMENTS

| | | |
|---|---|---|
| EP | 0606850 A2 | 7/1994 |
| EP | 2437329 A1 | 4/2012 |

(Continued)

OTHER PUBLICATIONS

International Search Report for PCT/KR2015/000379 dated May 26, 2015.

*Primary Examiner* — Tracy Dove
(74) *Attorney, Agent, or Firm* — Birch, Stewart, Kolasch & Birch, LLP (57) ABSTRACT

Disclosed is a battery pack which can be adaptively used even in various approaching and extending directions of a connection wire even while ensuring the safety by minimizing exposure of an electrode terminal. The battery pack according to the present invention comprises: a cell assembly having a plurality of secondary batteries; a pack housing having an internal space to receive the cell assembly; an electrode terminal which is connected to the cell assembly and is formed to protrude to the outside of the pack housing; and a terminal cover which covers the top portion and a part of the sides of the electrode terminal and is configured to be attached/detached to/from different portions of the pack housing.

14 Claims, 9 Drawing Sheets

(56) References Cited

FOREIGN PATENT DOCUMENTS

| | | |
|---|---|---|
| JP | 11-250950 A | 9/1999 |
| JP | 2002-231218 A | 8/2002 |
| JP | 2004-63442 A | 2/2004 |
| KR | 10-1999-0043226 A | 6/1999 |
| KR | 10-0792416 B1 | 1/2008 |
| WO | WO 86/07319 A1 | 12/1986 |

* cited by examiner

BATTERY PACK

TECHNICAL FIELD

The present disclosure relates to a battery pack including a plurality of secondary batteries, and more particularly, to a battery pack which may reduce outside exposure by covering an electrode terminal and also allow a connection member of the electrode terminal to access and extend in various directions.

The present application claims priority to Korean Patent Application No. 10-2014-0007152 filed on Jan. 21, 2014 in the Republic of Korea, the disclosures of which are incorporated herein by reference.

BACKGROUND ART

Recently, the demand for portable electronic products such as notebooks, video cameras, cellular phones or the like has rapidly increased, and electric vehicles, energy storage batteries, robots, satellites have been actively developed. For this reason, high-performance secondary batteries allowing repeated charging and discharging are being actively studied.

Currently, nickel-cadmium batteries, nickel-metal hydride batteries, nickel-zinc batteries, lithium secondary batteries, and the like are used as commercial secondary batteries. Among them, lithium secondary batteries have little to no memory effect in comparison with nickel-based secondary batteries, and thus lithium secondary batteries are gaining a lot of attention for their advantages of free charging or discharging, low self-discharging, and high energy density.

A lithium secondary battery generally uses lithium oxide and carbonaceous material as a positive electrode active material and negative electrode active material, respectively. The lithium secondary battery includes an electrode assembly in which a positive electrode plate and a negative electrode plate respectively coated with the positive electrode active material and the negative electrode active material are disposed with a separator being interposed between them, and an exterior, namely a battery case, which seals and accommodates the electrode assembly together with an electrolyte.

Generally, a lithium secondary battery may be classified into a can-type secondary battery where the electrode assembly is included in a metal can and a pouch-type battery where the electrode assembly is included in a pouch of an aluminum laminate sheet, depending on the shape of the exterior.

Recently, secondary batteries are widely used not only for small-sized devices such as cellular phones but also middle-sized or large-sized devices such as vehicles and power storages. In particular, along with the exhaustion of carbon energy and the increased interest on environments, hybrid electric vehicles and electric vehicles attract attention globally, for example in US, Europe, Japan and Korea. In such a hybrid electric vehicle or electric vehicle, a battery pack for giving a driving force to a vehicle motor is the most essential part. Since a hybrid electric vehicle or electric vehicle may obtain a driving force by means of charging and discharging of the battery pack, the hybrid electric vehicle or electric vehicle has many advantages in various aspects, for example excellent fuel efficiency and no or reduced exhaust of pollutants, and for this reason, hybrid electric vehicles and electric vehicles are used more and more.

The battery pack of such a hybrid electric vehicle or electric vehicle includes a plurality of secondary batteries, and the plurality of secondary batteries is connected to each other in series or in parallel to enhance capacity and output. A general battery pack, including the battery pack for a vehicle, includes a cell assembly having a plurality of secondary batteries in a stacked form and a pack housing for receiving the cell assembly in an internal space thereof. In addition, in order to use the battery pack, the battery pack should be electrically connected to an external device by means of a connection member such as a connection wire and a bus bar, and for this connection, an electrode terminal may be provided at the battery pack. In particular, for easily coupling with the connection member, the electrode terminal is frequently formed to protrude outwards at the pack housing and thus be exposed outwards. Therefore, if one end of the connection member is coupled to contact the electrode terminal and the other end of the connection member extends from one end and is connected to an external device such as a motor, a driving power may be supplied from the battery pack to the motor.

However, in this configuration of the battery pack, since the electrode terminal is exposed outwards, several problems may occur. For example, if the electrode terminal is exposed outwards, a conductive substance such as a bolt, a metallic piece or a wire may come into contact with the electrode terminal, and this may cause an electric short circuit. In addition, such contact of a conductive substance may damage the battery pack or other electric systems and also cause sparks, which may result in fire. Therefore, in an existing technique, various attempts have been made to reduce or eliminate the exposure of the electrode terminal. As a representative example, a terminal cover is provided to cover the electrode terminal.

However, in this configuration, even though the safety may be improved by reducing the exposure of the electrode terminal by means of the terminal cover, the battery pack may not be applied to various kinds of devices. In other words, the connection member for connecting to the electrode terminal of the battery pack may have various approaching or extending directions depending on a device to which the battery pack is applied. For example, on the basis of the same battery pack, a connection wire may approach from a left side to connect to the electrode terminal so as to extend in a left direction of the electrode terminal, or the connection wire may also approach from a front side to connect to the electrode terminal so as to extend in a front direction of the electrode terminal. However, if the battery pack includes the terminal cover, since an exposed portion of the terminal cover is restricted, if an approaching or extending direction of the connection wire is changed, the corresponding terminal cover may not be used, and another kind of terminal cover should be used. Therefore, if the existing configuration as described above is used, the battery pack has deteriorated compatibility depending on the kind of device to which the battery pack is applied.

DISCLOSURE

Technical Problem

Therefore, the present disclosure is designed to solve the problems of the related art, and therefore the present disclosure is directed to providing a battery pack, and a vehicle including the same, which may be adaptively used for various approaching and extending directions of a connection wire while ensuring safety, by minimizing exposure of an electrode terminal.

Other objects and advantages of the present disclosure will be understood from the following descriptions and become apparent by the embodiments of the present disclosure. In addition, it is understood that the objects and advantages of the present disclosure may be implemented by components defined in the appended claims or their combinations.

Technical Solution

In one aspect of the present disclosure, there is provided a battery pack, comprising: a cell assembly having a plurality of secondary batteries; a pack housing having an internal space to receive the cell assembly therein; an electrode terminal connected to the cell assembly to protrude out of the pack housing; and a terminal cover configured to cover a top portion and a part of sides of the electrode terminal, the terminal cover being configured to be attached or detached to/from different locations of the pack housing.

Preferably, the terminal cover may be configured to be mountable at different locations of the pack housing so that an exposed side of the electrode terminal is changed depending on a mounting location.

Also preferably, the pack housing may have a rectangular top surface having four edges, among which at least one edge has a concave portion with two outer side surfaces opened, and the electrode terminal is located at the concave portion.

Also preferably, the pack housing may have at least two coupling portions at different locations to be coupled with the terminal cover on the basis of the concave portion, so that the terminal cover is capable of being coupled at different locations.

Also preferably, the coupling portion may include at least one of a protrusion and a groove, and the terminal cover includes at least one of a groove and a protrusion, which corresponds to the coupling portion.

Also preferably, the coupling portion may include a groove formed at a location out of an inner side surface of the concave portion in a lower direction and a protrusion formed at a location out of an outer side surface of the concave portion in a horizontal direction.

Also preferably, the terminal cover may have a support formed to protrude in a lower direction at a location out of the protrusion, which is inserted into the groove of the coupling portion, to contact the inner side surface of the concave portion.

Also preferably, the concave portion may have a rectangular shape, when being observed in a lower direction from the above.

Also preferably, the pack housing may include coupling portions respectively at outer portions of two inner side surfaces of the concave portion, so that the terminal cover is capable of being mounted at different locations.

Also preferably, the terminal cover may cover one outer side surface of the two opened outer side surfaces and allow the other one outer side surface to be exposed.

Also preferably, the electrode terminal may be formed to protrude in an upper direction.

Also preferably, the terminal cover may be configured to be bent in a vertical direction.

Also preferably, the terminal cover may have at least one reinforcing portion at an inner surface thereof to support two surfaces perpendicular to each other on the basis of the bent portion.

Also preferably, the terminal cover may have an uneven portion formed at an outer surface thereof in a vertical direction.

Also preferably, the electrode terminal may include a positive electrode terminal and a negative electrode terminal, and the battery pack may include two terminal covers to cover the positive electrode terminal and the negative electrode terminal, respectively.

In another aspect of the present disclosure, there is also provided a vehicle, comprising the battery pack according to the present disclosure.

Advantageous Effects

According to the present disclosure, since external exposure of an electrode terminal is reduced due to a terminal cover, the safety of the battery pack may be improved.

In particular, in an embodiment of the present disclosure, if the same terminal cover is coupled at different locations of the pack housing, different sides of the electrode terminal may be exposed.

Therefore, even though a device to which the battery pack is applied is changed and thus a connection structure for the electrode terminal is also changed, for example even though an approaching or extending direction of a connection wire or the like is changed, the changed connection structure may be coped with by changing a coupling location of the terminal cover with respect to the pack housing.

Therefore, in an embodiment of the present disclosure, even though a connection structure for the electrode terminal of the battery pack is changed, it is not needed to exchange the terminal cover or the battery pack with a new one.

In this point of view, the battery pack according to the present disclosure may have improved compatibility to various devices.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
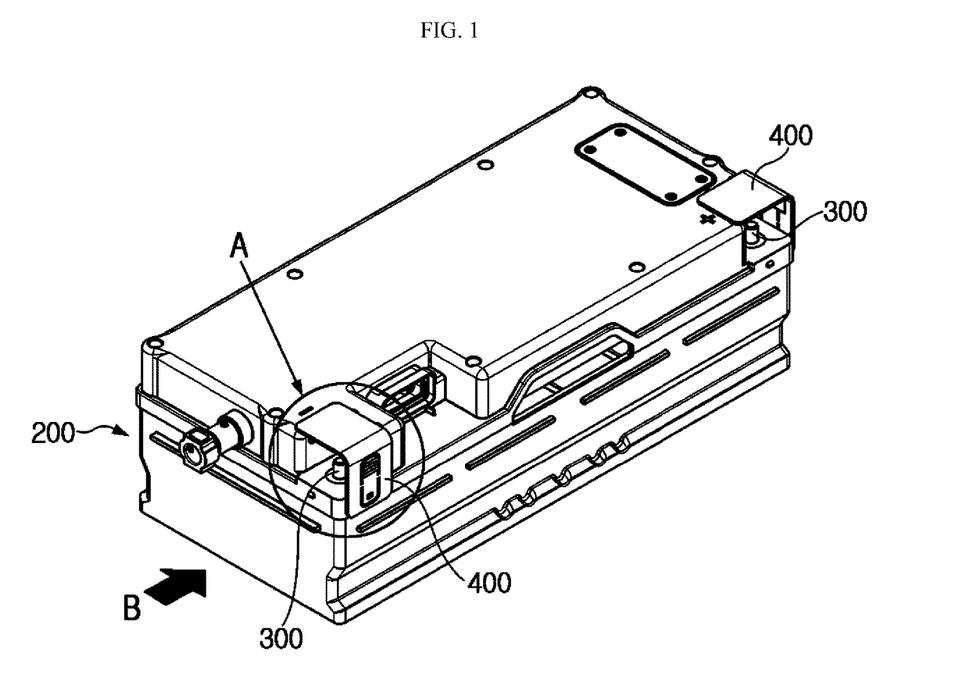
FIG. 1 is an assembled perspective view schematically showing a battery pack according to an embodiment of the present disclosure.
Figure 2:
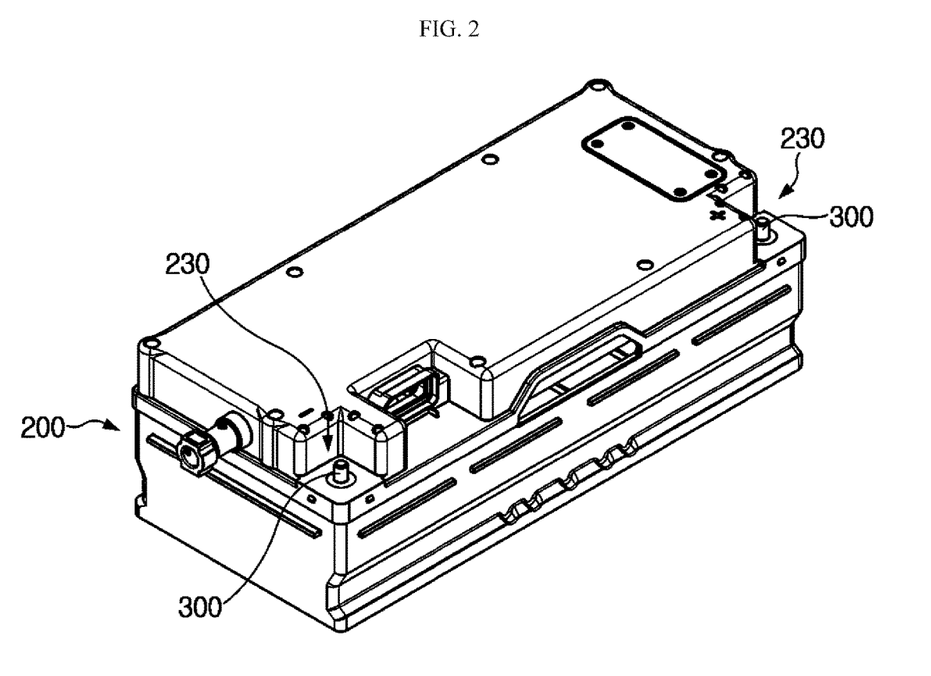
FIG. 2 is a diagram showing the battery pack of FIG. 1, from which a terminal cover is removed.
Figure 3:
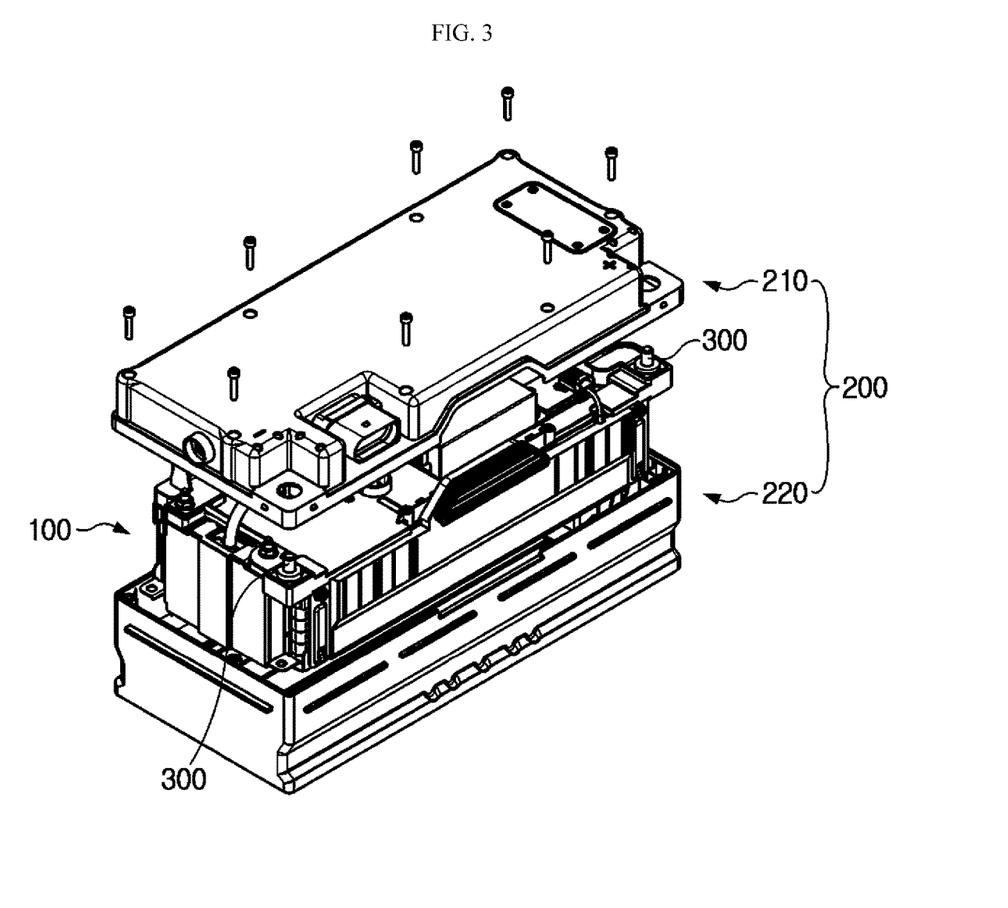
FIG. 3 is an exploded perspective view showing the battery pack of FIG. 2.

FIG. 1 is an assembled perspective view schematically showing a battery pack according to an embodiment of the present disclosure. FIG. 2 is a diagram showing the battery pack of FIG. 1, from which a terminal cover 400 is removed. FIG. 3 is an exploded perspective view showing the battery pack of FIG. 2.

Referring to FIGS. 1 to 3, the battery pack according to the present disclosure includes a cell assembly 100, a pack housing 200, an electrode terminal 300 and a terminal cover 400.

The cell assembly 100 has at least one secondary battery. In particular, in the battery pack, the cell assembly 100 may be a secondary battery aggregation having a plurality of secondary batteries. Here, the plurality of secondary batteries may be pouch-type secondary batteries. In this case, the pouch-type secondary batteries may be configured to be stacked in one direction, for example in a vertical direction.

Meanwhile, the cell assembly 100 may include a stacking frame for stacking a plurality of secondary batteries. The stacking frame is a component used for stacking secondary batteries, and the stacking frame may hold secondary batteries to prevent shaking of the secondary batteries, and many stacking frames may be stacked with each other to guide assembling of secondary batteries. The stacking frame may also be called with various terms, for example a cartridge, and may have a rectangular ring shape with a hollow center. In this case, four edges of the stacking frame may be located at the outer circumference of a pouch-type secondary battery, respectively.

The pack housing 200 has an interior space formed thereon, and a cell assembly 100 may be received in the internal space. The pack housing 200 may serve as an exterior of a battery pack, and thus the pack housing 200 may give structural stability to the battery pack and play a role of protecting components such as the cell assembly 100 received therein against external physical factors such as impacts and substances.

In addition, the pack housing 200 may receive various electronic components in the internal space in addition to the cell assembly 100. For example, a battery management system (BMS), a current sensor, a relay, a fuse or the like may be further received in the internal space of the pack housing 200.

Meanwhile, as shown in FIG. 3, the pack housing 200 may include a lower housing 220 and an upper housing 210. At this time, the lower housing 220 may have an accommodation space therein with an open top, and the upper housing 210 may be formed to cover the open top of the lower housing 220. In addition, the lower housing 220 and the upper housing 210 may be coupled to each other by coupling their rims with a coupling member such as a bolt.

The electrode terminal 300 is connected to the cell assembly 100 to give an electric connection between the cell assembly 100 and an external device. In more detail, the electrode terminal 300 may be directly or indirectly connected to an electrode lead of a secondary battery included in the cell assembly 100. For example, the electrode terminal 300 may be electrically connected to the electrode lead of the secondary battery by means of a bus bar.

In addition, the electrode terminal 300 may be formed to protrude out of the pack housing 200 in a state of being connected to the cell assembly 100. At this time, as shown in FIG. 3, a hole may be formed at the pack housing 200, particularly at the upper housing 210, so that the electrode terminal 300 is exposed outwards. Here, if the upper housing 210 and the lower housing 220 are coupled to each other, the electrode terminal 300 may protrude out of the upper housing 210 through the hole of the upper housing 210.

In particular, the battery pack may include two electrode terminals 300. At this time, one electrode terminal 300 may serve as a positive electrode terminal, and the other electrode terminal 300 may serve as a negative electrode terminal. In other words, the electrode terminal 300 may include a positive electrode terminal and a negative electrode terminal, and here, the positive electrode terminal may be connected to a positive electrode lead of a secondary battery included in the cell assembly 100 and the negative electrode terminal may be connected to a negative electrode lead of the secondary battery included in the cell assembly 100.

Preferably, the electrode terminal 300 may protrude in an upper direction as shown in the figures.

In this configuration of the present disclosure, when a connection wire or the like is connected to the electrode terminal 300 of the battery pack, a connecting work may be performed more easily, and a connecting structure may be more simplified. For example, when the battery pack is mounted to a vehicle, if the battery pack is to be repaired or exchanged, the battery pack may be approached in a lower direction from a location above the battery pack. At this time, if the electrode terminal 300 protrudes in an upper direction as in this embodiment, a worker may separate the connection wire from the electrode terminal 300 at a location above the battery pack, and then, after repairing or exchanging the battery pack, the worker may connect the connection wire to the electrode terminal 300 again, in an easier way.

The terminal cover 400 may be configured to cover a part of the electrode terminal 300. In other words, the electrode terminal 300 may be formed to protrude out of the pack housing 200, and in this case, the terminal cover 400 may allow the electrode terminal 300 to be partially exposed outwards and cover the other part of the electrode terminal 300 not to be exposed.

In particular, the terminal cover 400 may be configured to cover a top portion and a part of sides of the electrode terminal 300.

For example, referring to a portion A of FIG. 1, the terminal cover 400 blocks a right surface of the electrode terminal 300 and allows a front surface of the electrode terminal 300 to be exposed. Here, the right surface means a side located at the right of the electrode terminal 300 when the battery pack is observed in a B direction, and the front surface means a side located just at the front. Hereinafter, the right, left, front and rear directions will be applied in the same way, unless stated otherwise.

In addition, the terminal cover 400 covers the top portion of the electrode terminal 300 so that the top portion of the electrode terminal 300 is not exposed outwards.

In this configuration of the present disclosure, among the top portion, the right surface and the front surface of the electrode terminal 300, the top portion and the right surface of the electrode terminal 300 may not be exposed, and only the front surface of the electrode terminal 300 may be exposed, thereby reducing outside exposure of the electrode terminal 300. Therefore, in this embodiment of the present disclosure, any problem caused by the exposure of the electrode terminal 300, for example an internal short circuit, spark, fire or the like caused when a metallic substance contacts the electrode terminal 300, may be effectively prevented.

Preferably, the battery pack may include at least two terminal covers 400. In particular, the battery pack may include two electrode terminals 300, namely a positive electrode terminal and a negative electrode terminal, and in this case, the battery pack may also two terminal covers 400 to cover the positive electrode terminal and the negative electrode terminal, respectively.

At this time, two terminal covers 400 may be configured to expose the same side of the electrode terminals 300 or different sides thereof. For example, as shown in FIG. 1, when the battery pack is observed in a B direction, the terminal cover 400 located at the front (located at the portion A) may be configured to expose the front surface of the electrode terminal 300, and the terminal cover 400 located at the rear may be configured to expose the right surface of the electrode terminal 300.

In particular, in the present disclosure, the terminal cover 400 may detachably mounted at different locations of the pack housing 200. In other words, the terminal cover 400 is detachably mounted to the pack housing 200, but the mounting position at the pack housing 200 is not limited to a single location, but the terminal cover 400 may be mounted at two or more locations. This will be described later in more detail with reference to FIGS. 4 to 6.

Figure 4:
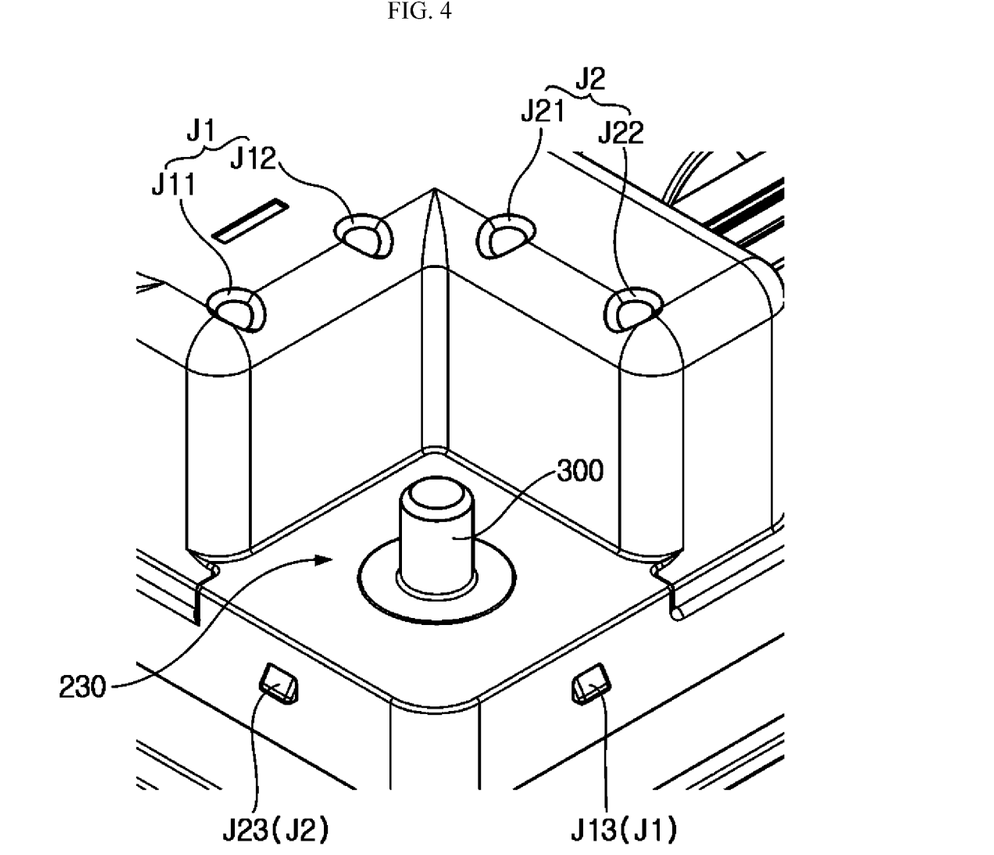
FIG. 4 is an enlarged perspective view showing a portion A of FIG. 1, at which the terminal cover is detached.
Figure 5:
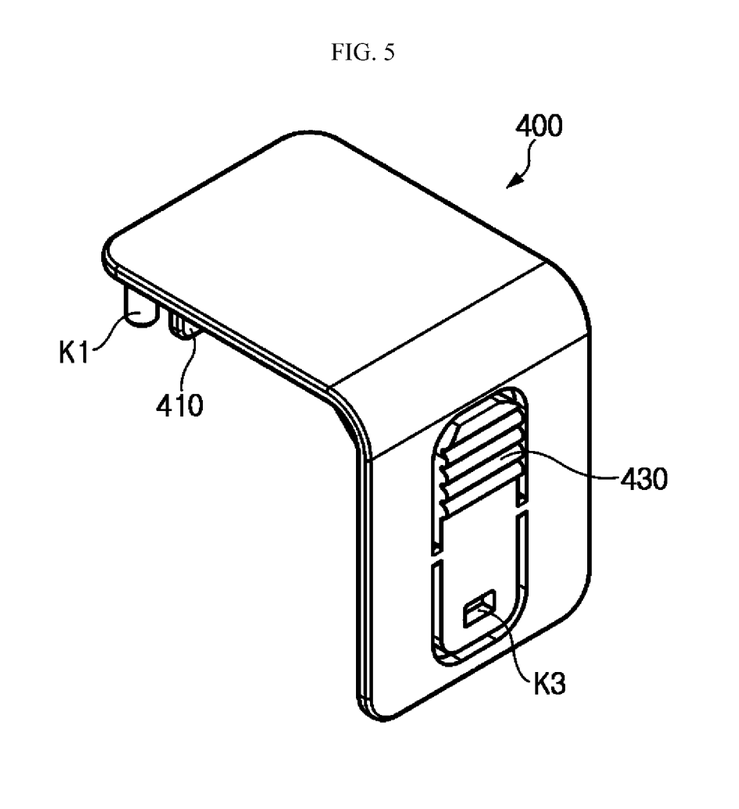
FIG. 5 is an enlarged perspective view showing the terminal cover in the portion A of FIG. 1.
Figure 6:
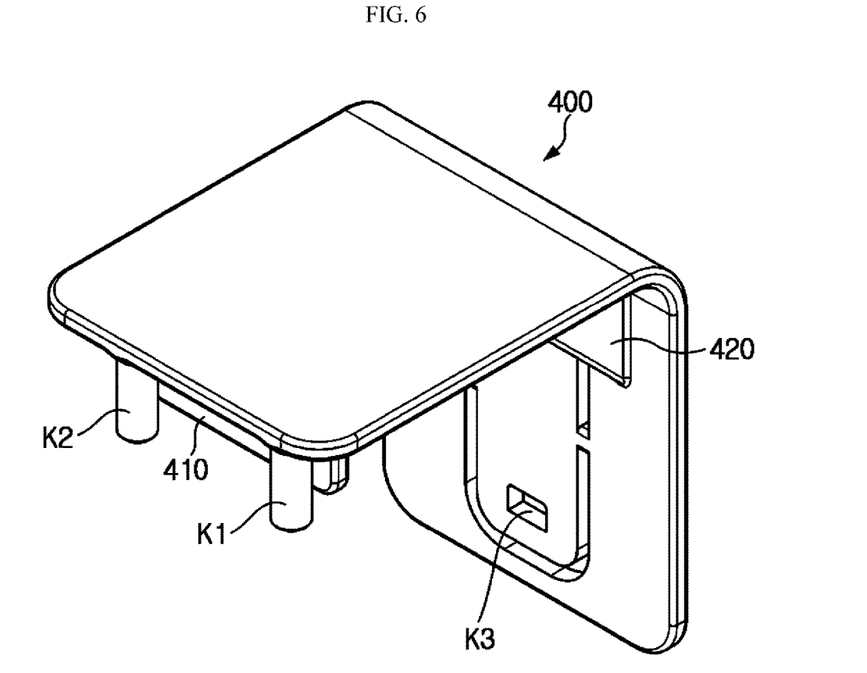
FIG. 6 is a diagram showing the configuration of FIG. 5, which is observed at an approximately opposite side.

FIG. 4 is an enlarged perspective view showing a portion A of FIG. 1, at which the terminal cover 400 is detached. Also, FIG. 5 is an enlarged perspective view showing the terminal cover 400 in the portion A of FIG. 1, and FIG. 6 is a diagram showing the configuration of FIG. 5, which is observed at an approximately opposite side.

First, referring to FIG. 4, the pack housing 200 may have at least two coupling portions which are to be coupled to the terminal cover 400. For example, as shown in FIG. 4, the pack housing 200 may include two coupling portions, namely a first coupling portion designated by J1 and a second coupling portion designated by J2, and the terminal cover 400 may be coupled to any one of two coupling portions. In other words, the terminal cover 400 may be configured to be coupled to the first coupling portion J1 or the second coupling portion J2.

Here, the first coupling portion and the second coupling portion may be configured to have at least one of a protrusion and a groove. In addition, the terminal cover 400 may be configured to include at least one of a groove and a protrusion, which corresponds to the coupling portion.

For example, as shown in FIG. 4, the first coupling portion may be configured to include two grooves J11, J12 and one protrusion J13. Also, the second coupling portion may be configured to include two grooves J21, J22 and one protrusion J23. In this case, as shown in FIGS. 5 and 6, the terminal cover 400 may be configured to include two protrusions K1, K2 and one groove K3.

Therefore, if the terminal cover 400 is coupled to the first coupling portion, two protrusions K1, K2 of the terminal cover 400 may be respectively inserted into the grooves J11, J12 of the first coupling portions, and the protrusion J13 of the first coupling portion may be inserted into one groove K3 of the terminal cover 400. In other case, if the terminal cover 400 is coupled to the second coupling portion, two protrusions K1, K2 of the terminal cover 400 may be inserted into the grooves J21, J22 of the second coupling portions, respectively, and the protrusion J23 of the second coupling portion may be inserted into one groove K3 of the terminal cover 400.

Here, for each attachment and detachment of the terminal cover 400 to the first coupling portion or the second coupling portion, the protrusion J13 of the first coupling portion or the protrusion J23 of the second coupling portion may be fixed to the groove K3 of the terminal cover 400 by hooking. In other words, the protrusion J13 of the first coupling portion and the protrusion J23 of the second coupling portion may have a hook shape at a lower end thereof, so that they are easily fixed in a vertical direction when being coupled to the groove K3 of the terminal cover 400.

In particular, in the present disclosure, the terminal cover 400 is configured to be detachably attachable to at least two different locations of the pack housing 200, so that an exposed side of the electrode terminal 300 may be changed.

Figure 7:
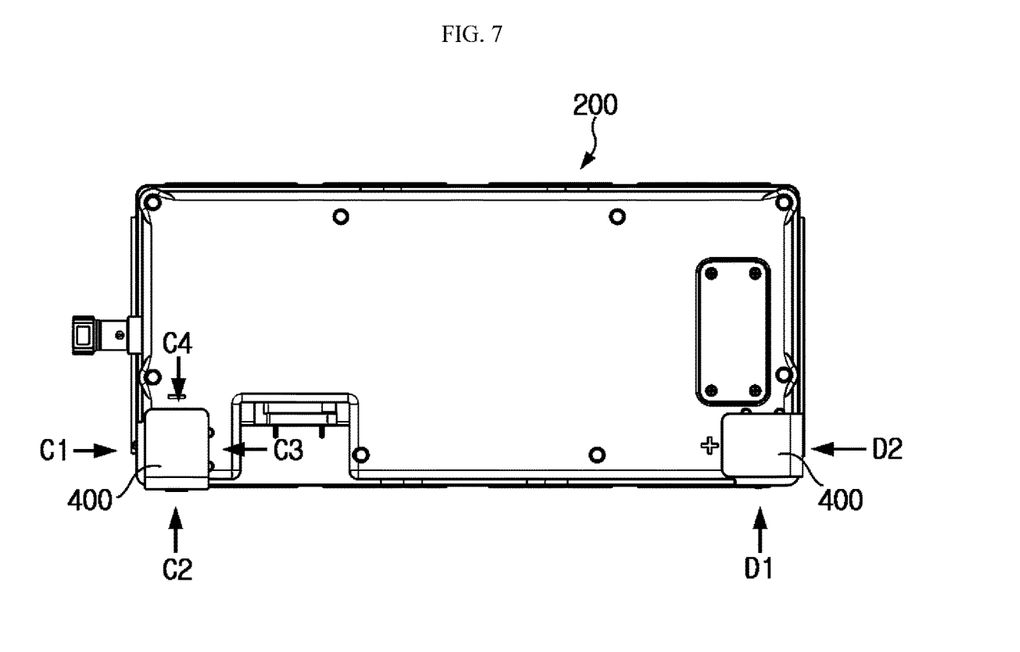
FIGS. 7 and 8 are top views schematically showing that the terminal cover is mounted to different locations of the battery pack according to an embodiment of the present disclosure.
Figure 8:
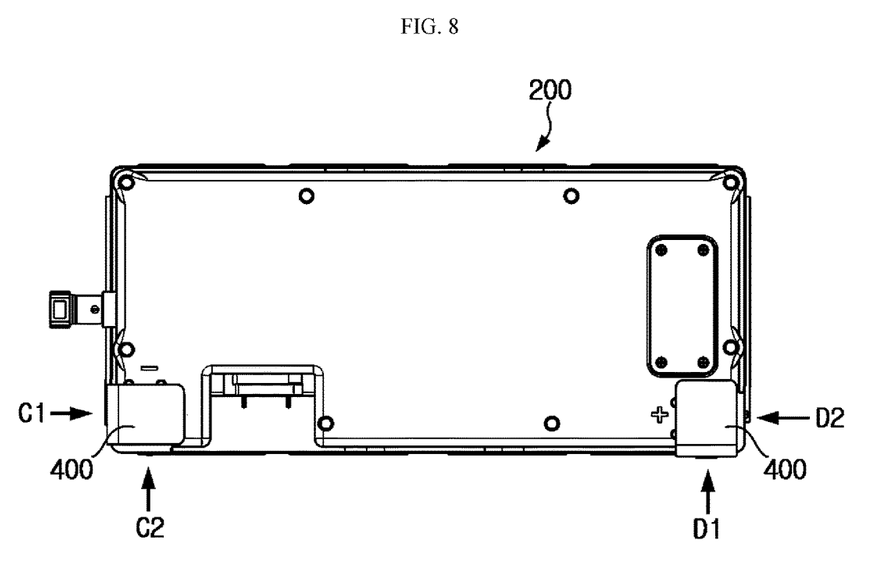

FIGS. 7 and 8 are top views schematically showing that the terminal cover 400 is mounted to different locations of the battery pack according to an embodiment of the present disclosure.

Referring to FIGS. 7 and 8, the battery pack includes two terminal covers 400, which cover different electrode terminals 300, respectively.

First, the coupling configuration of the terminal cover 400 depicted at a left side in FIG. 7 may be regarded as showing that the terminal cover 400 of FIGS. 4 to 6 is coupled to the first coupling portion J1 of the pack housing 200. In other words, if the terminal cover 400 of FIGS. 5 and 6 is coupled to the first coupling portion J1 of FIG. 4, the left lower configuration of FIG. 7 may be obtained. In this case, a side C1 of the electrode terminal 300 may be exposed by means of the left terminal cover 400. In addition, in FIG. 7, a side D1 of the electrode terminal 300 may be exposed by means of the right terminal cover 400.

Meanwhile, the coupling configuration of the terminal cover 400 depicted at a left side in FIG. 8 may be regarded as showing that the terminal cover 400 of FIGS. 4 to 6 is coupled to the second coupling portion J2 of the pack housing 200. In other words, if the terminal cover 400 of FIGS. 5 and 6 is coupled to the second coupling portion J2 of FIG. 4, the left lower configuration of FIG. 8 may be obtained. In this case, a side C2 of the electrode terminal 300 may be exposed by means of the left terminal cover 400. In addition, in FIG. 8, a side D2 of the electrode terminal 300 may be exposed by means of the right terminal cover 400.

As described above, in the present disclosure, the same terminal cover 400 may be coupled at different locations to change an exposed side of the electrode terminal 300. Therefore, even though a connection wire to be connected to the terminal cover 400 extends in any direction, the connection wire may easily approach and be connected to the electrode terminal 300 by changing an exposed side of the electrode terminal 300 by means of the terminal cover 400.

For example, in the configuration of FIGS. 7 and 8, if a connection wire to be connected to the left electrode terminal 300 approaches and extends in a C1 direction and also a connection wire to be connected to the right electrode terminal 300 approaches and extends in a D1 direction, the terminal cover 400 may be coupled to the pack housing 200 as shown in FIG. 7. In addition, if a connection wire to be connected to the left electrode terminal 300 approaches and extends in a C2 direction and also a connection wire to be connected to the right electrode terminal 300 approaches and extends in a D2 direction, the terminal cover 400 may be coupled to the pack housing 200 as shown in FIG. 8.

In addition, if a connection wire to be connected to the left electrode terminal 300 extends in a C1 direction and also a connection wire to be connected to the right electrode terminal 300 extends in a D2 direction, the left terminal cover 400 may be coupled to the pack housing 200 as shown in FIG. 7 and the right terminal cover 400 may be coupled to the pack housing 200 as shown in FIG. 8.

Meanwhile, as shown in FIGS. 7 and 8, the pack housing 200 may have a rectangular surface, which is observed in a lower direction from the above, namely a rectangular top surface. At this time, the pack housing 200 may have four edges, among which at least one edge may have a concave portion 230. In other words, seeing the configuration of FIGS. 1 and 2, the pack housing 200 has four edges at the top portion, among which two edges have concave portions 230, and one electrode terminal 300 may be located at each of the concave portions 230.

If the concave portion 230 is formed at an edge of a rectangular pack housing 200 as described above, two sides of the concave portion 230 may be opened. In other words, the sides indicated by arrows C1 and C2 in FIGS. 7 and 8 are outer side surfaces located at an edge of the pack housing 200, and these two outer side surfaces may be exposed out of the pack housing 200 in a horizontal direction.

If two outer side surfaces of the concave portion 230 are opened as described above, the terminal cover 400 may cover one outer side surface of two outer side surfaces of the concave portion 230 and allow the other outer side surface to be exposed.

For example, in the configuration of FIG. 7, the left terminal cover 400 covers outer side surface in the C2 direction not to be exposed and allows only outer side surface in the C1 direction to be exposed in a horizontal direction. On the contrary, in the configuration of FIG. 8, the left terminal cover 400 covers outer side surface in the C1 direction not to be exposed and allows only outer side surface in the C2 direction to be exposed in a horizontal direction.

In addition, in FIG. 7, outer side surface in the D2 direction is covered by the right terminal cover 400 and thus not exposed, and only outer side surface in the D1 direction is exposed. On the contrary, in FIG. 8, outer side surface in the D1 direction is covered by the right terminal cover 400 and thus not exposed, and only outer side surface in the D2 direction is exposed.

Meanwhile, as described above with reference to FIG. 4, the pack housing 200 may have a coupling portion for coupling with the terminal cover 400, and the coupling portion may have a protrusion and/or a groove.

In particular, the coupling portion of the pack housing 200 may have a groove formed in a lower direction at a location out of an inner side surface of the concave portion 230. In addition, the coupling portion of the pack housing 200 may have a protrusion protruding in a horizontal direction at a location out of an outer side surface of the concave portion 230.

For example, referring to the configuration of FIG. 4, the grooves J11, J12 of the first coupling portion are formed in a lower direction at the top portion and may be located an outer location from the inner side surface of the concave portion 230. At this time, since the inner side surface of the concave portion 230 is formed as a barrier for blocking the concave portion 230, an outer side of the inner side surface of the concave portion 230 may be formed higher than the concave portion 230. Therefore, the grooves J11, J12 of the first coupling portion may be formed at higher locations than the concave portion 230. In addition, the protrusion J13 of the first coupling portion is formed to protrude in a horizontal direction and may be located out of the outer side surface of the concave portion 230. At this time, since the outer side surface of the concave portion 230 is formed to open the concave portion 230, an outer side of the outer side surface of the concave portion 230 may be formed lower than the concave portion 230. Therefore, the protrusion J13 of the first coupling portion may be formed at a lower location than the concave portion 230.

In addition, the grooves J21, J22 of the second coupling portion may also be formed in a lower direction at locations out of the inner side surface of the concave portion 230, similar to the grooves J11, J12 of the first coupling portion. In addition, the protrusion J23 of the second coupling portion may also be formed in a horizontal direction at a location out of the outer side surface of the concave portion 230, similar to the protrusion J13 of the first coupling portion.

Here, the terminal cover 400 may be configured as shown in FIGS. 5 and 6, so that the protrusions K1, K2 are coupled to the grooves J11, J12 of the first coupling portion or the grooves J21, J22 of the second coupling portion.

More preferably, the terminal cover 400 may further include a support 410. The support 410 will be described below in more detail with reference to FIGS. 9 and 10.

Figure 9:
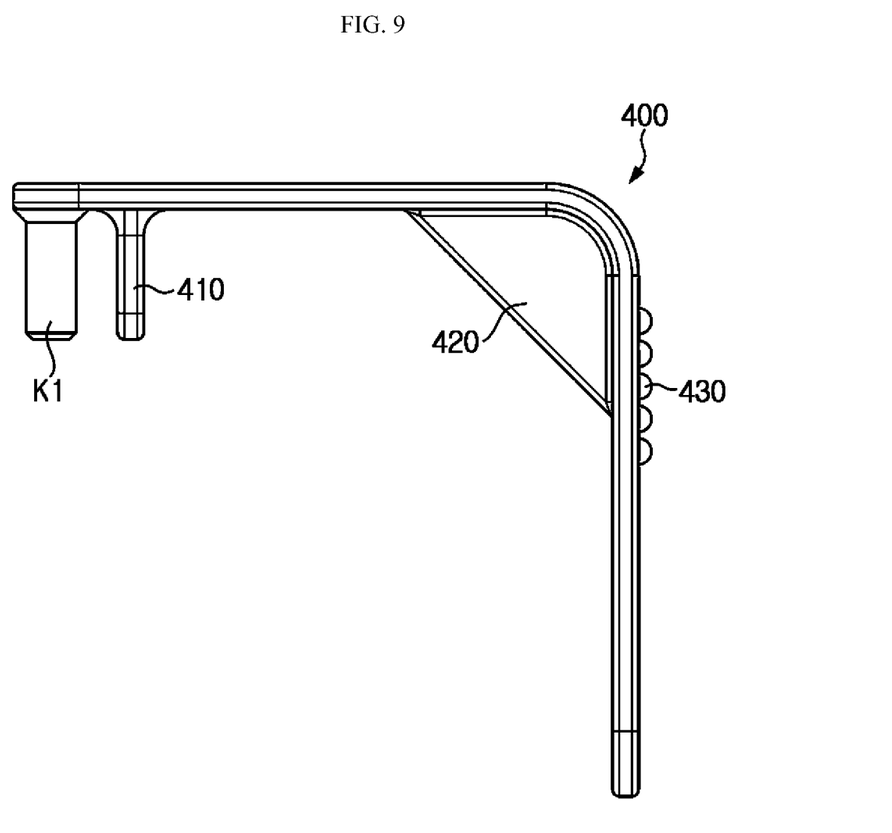
FIG. 9 is a front view showing the terminal cover depicted in FIGS. 5 and 6.
Figure 10:
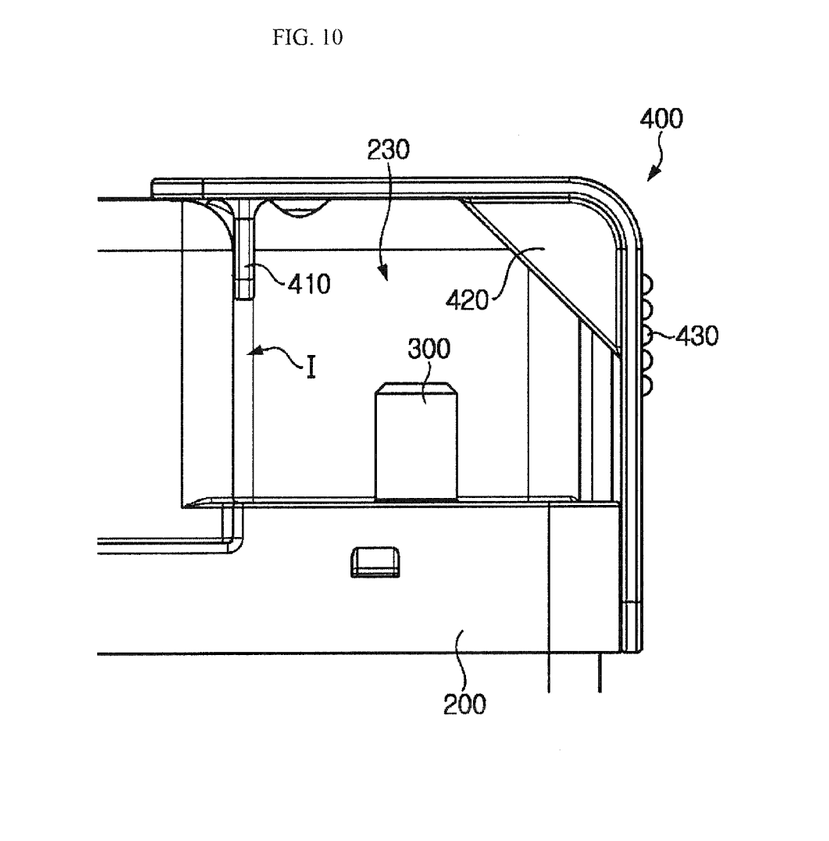
FIG. 10 is a front view showing that the terminal cover of FIG. 9 is coupled to the pack housing of FIG. 4.

FIG. 9 is a front view showing the terminal cover 400 depicted in FIGS. 5 and 6. Also, FIG. 10 is a front view showing that the terminal cover 400 of FIG. 9 is coupled to the pack housing 200 of FIG. 4. FIG. 10 may also be regarded as a drawing at which the portion A of FIG. 1 is observed in a B direction.

Referring to FIGS. 9 and 10, the terminal cover 400 may include the support 410 in addition to the protrusions K1, K2. The support 410 is formed at the top portion to protrude in a lower direction, and in view of the battery pack, the support 410 may be regarded as being located outer than the protrusions K1, K2. On the contrary, in view of the terminal cover 400, the support 410 may also be regarded as being located inner than the protrusions K1, K2.

In particular, if the concave portion 230 is formed at the edge, the outer side surface of the concave portion 230 may be formed open, and the inner side surface I of the concave portion 230 may be formed closed. At this time, as shown in FIG. 10, the support 410 may come into contact with the inner side surface I of the concave portion 230, which is formed higher than the concave portion 230. In this configuration of the present disclosure, since the support 410 of the terminal cover 400 is supported in contact with the surface of the pack housing 200, it is possible to prevent the terminal cover 400 from being deformed or easily moved or deviated from the concave portion 230. In particular, if the terminal cover 400 is bent in a vertical direction as shown in FIG. 10, an upper portion of the terminal cover 400 may be easily moved or deformed in a lateral direction, but the support 410 may prevent such movement or deformation. Further, the support 410 may prevent the terminal cover 400 from being moved or curved in an inner direction of the pack housing 200, namely in a left direction on the figure of FIG. 10.

Meanwhile, as shown in several figures, the concave portion 230 may have a rectangular shape, when being observed in a lower direction from the above. For example, referring to the configuration of FIG. 4, the concave portion 230 may be formed at the edge of the pack housing 200 and have a rectangular shape. In this case, the concave portion 230 has four sides, among which two sides are located at outer sides of the pack housing 200 and the other two sides are located at inner sides of the pack housing 200. Therefore, the concave portion 230 having a rectangular shape may be regarded as having two outer side surfaces and two inner side surfaces. In addition, since the concave portion 230 is located at the edge of the pack housing 200, two outer side surfaces may be formed open in a horizontal direction, and two inner side surfaces may be formed closed in a horizontal direction.

For example, in FIG. 7, the concave portion 230 formed at a left side may be regarded as having sides in four directions C1, C2, C3 and C4, among which the sides in the C1 and C2 directions may become outer side surfaces and the sides in the C3 and C4 directions may become inner side surfaces. In addition, it may be regarded that the outer side surfaces in the C1 and C2 directions are formed opened and the inner side surfaces in the C3 and C4 directions are formed closed.

In this configuration, the concave portion 230 may have different coupling portions formed out of two inner side surfaces. In other words, referring to the configuration of FIG. 4, the grooves J11, J12 of the first coupling portion may be forming out of one inner side surface (at a portion protruding further to the concave portion) of two inner side surfaces of the concave portion 230, and the grooves J21, J22 of the second coupling portion may be formed out of the other inner side surface (a portion protruding further to the concave portion). At this time, the protrusions K1, K2 of the terminal cover 400 may be coupled to the pack housing 200 by being inserted into the grooves J11, J12 of the first coupling portion or by being inserted into the grooves J21, J22 of the second coupling portion.

If the concave portion 230 has a rectangular shape as described above, the inner side surfaces and the outer side surfaces have shapes corresponding to each other, and thus the location of the terminal cover 400 may be changed more easily. In other words, the concave portion 230 has two inner side surfaces and two outer side surfaces, and the outer side surfaces and the inner side surfaces may be combined to have similar shapes or structures to each other. For example, in the configuration of FIG. 7, the outer side surface in the C2 direction and the inner side surface in the C4 direction may form a first coupling portion, and the outer side surface in the C1 direction and the inner side surface in the C3 direction may form a second coupling portion. At this time, if the concave portion 230 has a rectangular shape, the first coupling portion and the second coupling portion may have similar shapes as a whole. For example, the length and shape of the first coupling portion may be similar to those of the second coupling portion. Therefore, a single terminal cover 400 may be selectively coupled to the first coupling portion or the second coupling portion.

In particular, the concave portion 230 may have a square shape, when being observed in a lower direction from the above. In this case, two inner side surfaces and two outer side surfaces of the concave portion 230 have the same length, and thus two coupling portions may be configured with the same shape and size more easily.

Preferably, as shown in various figures, the terminal cover 400 may be configured with a plate shape bent in a vertical direction. In this case, the terminal cover 400 may have a horizontal portion having a horizontally flat surface and a vertical portion having a vertically flat surface.

In this configuration of the present disclosure, if the terminal cover 400 is coupled to the pack housing 200, it is possible to minimize protrusion of the terminal cover 400 out of the pack housing 200 and to facilitate easier coupling between the terminal cover 400 and the pack housing 200. In particular, if the pack housing 200 has a rectangular top surface as a whole and the concave portion 230 is formed at an edge of the top surface of the pack housing 200 so that the electrode terminal 300 is provided at the concave portion 230, when being coupled to the pack housing 200, the terminal cover 400 having a plate shape bent in a vertical direction covers the concave space of the concave portion 230 so that the pack housing 200 has a hexahedral shape as a whole.

As described above, if the terminal cover 400 has the horizontal portion and the vertical portion, the protrusion and support 410 may be configured to protrude in a lower direction at a lower surface of the horizontal portion as shown in FIG. 9. In addition, the groove may be formed at the vertical portion, as shown in FIGS. 5 and 6.

More preferably, the terminal cover 400 may have at least one reinforcing portion 420 at an inner side of the bent portion.

The reinforcing portion 420 is a component for reinforcing the terminal cover 400 in order to prevent the terminal cover 400 from being deformed or broken, and the reinforcing portion 420 may be provided at an inner side of the bent portion of the terminal cover 400. In particular, both ends of the reinforcing portion 420 may be respectively coupled at both sides on the basis of the bent portion, thereby supporting two surfaces perpendicular to each other. For example, referring to the configuration depicted in FIG. 9, the terminal cover 400 may be bent in a vertical direction at its center portion, one end of the reinforcing portion 420 may be coupled to the horizontal portion, and the other end of the reinforcing portion 420 may be coupled to the vertical portion. In this configuration of the present disclosure, the reinforcing portion 420 may reinforce mechanical rigidity of the terminal cover 400 and prevent deformation. In particular, the reinforcing portion 420 may allow the bending angle of the horizontal portion and the vertical portion of the terminal cover 400 to be kept consistently, without being deformed.

Also preferably, the terminal cover 400 may be configured to have an uneven portion 430 formed at an outer surface in a vertical direction.

For example, referring to FIGS. 9 and 10, the uneven portion 430 may be formed at the outer surface of the vertical portion of the terminal cover 400. In particular, the uneven portion 430 may have an unevenness in a vertical direction. In this configuration of the present disclosure, the terminal cover 400 may be manually attached or detached more easily. In other words, in the present disclosure, the terminal cover 400 may be mounted in a lower direction from the above, and the terminal cover 400 may be detached in an upper direction from the below. Here, if the uneven portion 430 having an unevenness formed in a vertical direction is used, the terminal cover 400 may be attached or detached more easily in a vertical direction.

The battery pack according to the present disclosure may be applied to a vehicle such as an electric vehicle and a hybrid electric vehicle. In other words, the vehicle according to the present disclosure may include the battery pack according to the present disclosure. In particular, in case of the battery pack according to the present disclosure, even though a connection wire to be connected to the battery pack approaches or extends in different directions, the terminal cover 400 may be used as it is after just changing its location, without being exchanged or removed, and thus the battery pack may be applied to various kinds of vehicles.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left, right, front and rear directions are used in the specification, it is obvious to those skilled in the art that these merely represent relative locations for convenience in explanation and may vary based on a location of an observer or a shape in which an object is placed.

What is claimed is:

1. A battery pack, comprising:
a cell assembly having a plurality of secondary batteries;
a pack housing having an internal space, wherein the cell assembly is provided in the internal space;
electrode terminals connected to the cell assembly to protrude out of the pack housing; and
terminal covers, each covering a top portion and a part of sides of a respective one of the electrode terminals, the terminal covers are configured to be attached to or detached from different locations of the pack housing,
wherein for each electrode terminal, the pack housing includes first and second coupling portions, the first and second coupling portions being provided at different locations on the pack housing,
wherein each of the first and second coupling portions includes at least one groove and at least one protrusion,
wherein each terminal cover includes:
at least one protrusion that is configured to be inserted into the at least one groove of a respective one of the first and second coupling portions; and
at least one groove that is configured to encompass the at least one protrusion of a respective one of the first and second coupling portions, and
wherein each terminal cover is configured to connect to only one of the respective first and second coupling portions at a time.

2. The battery pack according to claim 1,
wherein each terminal cover is configured to be mountable at different locations of the pack housing so that an exposed side of the respective electrode terminal is changed depending on a mounting location.

3. The battery pack according to claim 2,
wherein the pack housing has a rectangular top surface having four edges, among which at least two edges have a concave portion with two outer side surfaces opened, and the electrode terminals are located at a respective concave portion.

4. The battery pack according to claim 3,
wherein the at least one groove of first and second coupling portions is provided at an inner side surface of a respective concave portion in a lower direction and
wherein the at least one protrusion of the first and second coupling portions is provided at an outer side surface of the concave portion in a horizontal direction.

5. The battery pack according to claim 4,
wherein each terminal cover has a support formed to protrude in a lower direction at a location adjacent to the at least one protrusion, which is provided into the groove of the respective one of the first and second coupling portions and contacts the inner side surface of the concave portion.

6. The battery pack according to claim 3,
wherein each concave portion has a rectangular shape, when being observed in a lower direction from the above.

7. The battery pack according to claim 6,
wherein the first and second coupling portions are respectively provided at outer portions of two inner side surfaces of the concave portion, so that the respective terminal cover is capable of being mounted at different locations.

8. The battery pack according to claim 3,
wherein each terminal cover covers one outer side surface of the two opened outer side surfaces and allows the other one outer side surface to be exposed.

9. The battery pack according to claim 1,
wherein the electrode terminals are formed to protrude in an upper direction.

10. The battery pack according to claim 1,
wherein the terminal covers have a bent portion protruding in a vertical direction.

11. The battery pack according to claim 10,
wherein the terminal covers have at least one reinforcing portion at an inner surface thereof to support two surfaces perpendicular to each other on the basis of the bent portion.

12. The battery pack according to claim 1,
wherein the terminal covers have an uneven portion formed at an outer surface thereof in a vertical direction.

13. The battery pack according to claim 1,
wherein the electrode terminals include a positive electrode terminal and a negative electrode terminal, and the battery pack includes two terminal covers to cover the positive electrode terminal and the negative electrode terminal, respectively.

14. A vehicle, comprising the battery pack according to claim 1.

* * * * *